Patented June 15, 1926.

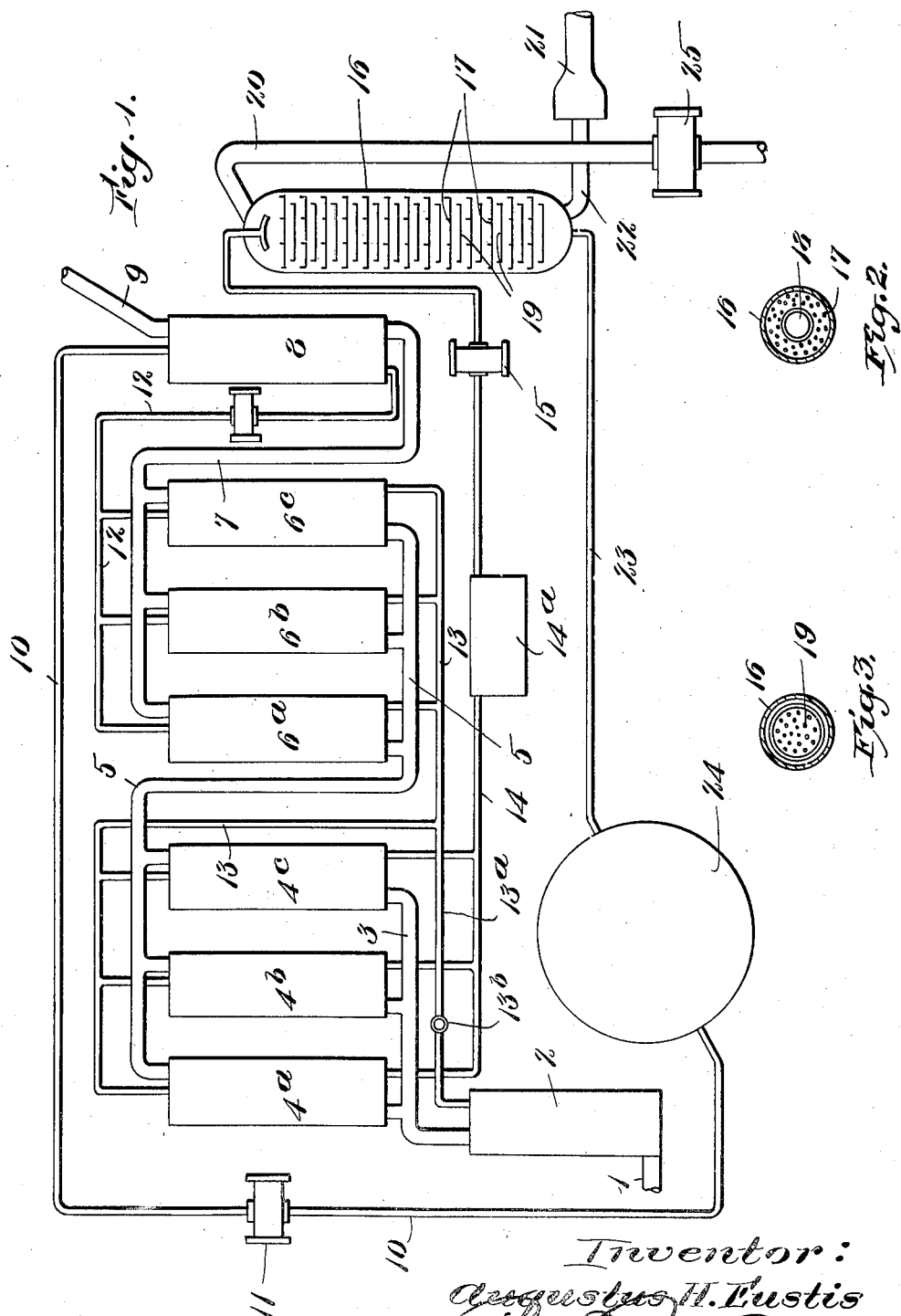

1,589,133

UNITED STATES PATENT OFFICE.

AUGUSTUS H. EUSTIS, OF MILTON, MASSACHUSETTS.

ART OF RECOVERING SULPHUR DIOXIDE FROM GASES WITH WHICH IT MAY BE ASSOCIATED AND APPARATUS THEREFOR.

Application filed February 7, 1920. Serial No. 356,814.

This invention relates to the art of recovering sulphur dioxide from smelter smoke or other gases with which it may be associated, and to apparatus therefor.

Stated in general terms processes of the character to which the present invention relates, as exemplified by Letters Patent of the United States No. 1,260,492, dated March 26, 1918; No. 1,260,493, dated March 26, 1918; No. 1,265,892, dated May 14, 1918 and an application for Letters Patent of the United States filed by me April 14, 1919, Serial Number 289,857, comprise absorbing sulphur dioxide gas from smelter smoke or other gas into water, and then extracting the sulphur dioxide from the water, and liquefying the sulphur dioxide gas if desired. These processes as heretofore practised have required a large amount of water with a correspondingly large plant and large amount of heat and power.

The ultimate objects of this invention are to provide a new and more economical method of getting the sulphur dioxide gas into the solution, and of extracting the sulphur dioxide from the solution, together with apparatus therefor; and to reduce the cost of operation by reducing the size of the plant necessary for carrying on the process and by reducing the volume of liquid treated and consequently the amount of heat and power required.

I have discovered that it is possible to use chemical reaction both as a means of collecting the sulphur dioxide into solution, and as a means of liberating the sulphur dioxide from the solution. By using a solution of a salt, such as aluminum sulphite, I have found that a much larger amount of sulphur dioxide may be taken into the solution than has been possible with the methods heretofore used. This I attribute to the chemical combination between the salt and the sulphur dioxide which results in the collection into the solution of a much larger quantity of the sulphur dioxide gas from mixtures of gases, such as a smelter smoke, or other mixtures containing sulphur dioxide gas, than results from the mere physical absorption of sulphur dioxide gas into a liquor. I have also found that the sulphur dioxide gas can then be extracted from the liquor by breaking down or decomposing the chemical combination, and that this can be done by reducing the partial pressure of the sulphur dioxide gas in the atmosphere contacting with the solution.

While I prefer to use aluminum sulphite as the reagent for taking sulphur dioxide into solution, other salts may be used, and it should be understood that the invention in its broader aspects is not limited to any particular salt but contemplates liquors containing any soluble metallic sulphites other than sulphites of the alkaline earths which reacts with sulphur dioxide to take the latter into the liquor, and which again readily liberates sulphur dioxide under the conditions prevailing in practice. Such conditions may, for example correspond to the boiling point of water or of the liquor in which the sulphur dioxide has been dissolved, with or without reduction in the superimposed pressure thereon.

Other important conditions, hereinafter more fully explained, are that the salt or other material should be one which will form with the sulphur dioxide a relatively unstable sulphite or bisulphite which will readily liberate the sulphur dioxide gas at moderate temperatures; and one whose sulphate is soluble, in order that insoluble precipitates may not be formed which are apt to clog the pipes and pumps. In most cases the liquor will be somewhat heated in the extractor and again cooled before entering the towers, and with heating and cooling it is difficult to avoid oxidation and the consequent forming of precipitated sulphates. A material should therefore be selected whose sulphate is soluble. Iron sulphite, for example, might be used and has the advantage of cheapness although it does not take up the sulphur dioxide quite as readily as aluminum sulphite. It gives up the sulphur dioxide from the liquor practically as easily. Sodium salts take up the sulphur dioxide more vigorously but will not give it up as readily. Calcium sulphite forms insoluble sulphates, and does not take up sulphur dioxide quite as well as aluminum sulphite. Copper sulphite absorbs about like iron sulphite and gives up somewhat more readily, but is expensive. Chromium and strontium sulphites make liquors which are troublesome and difficult to handle. All things considered I have found aluminum sulphite the preferable material, with perhaps iron sulphite as second choice. But it will be understood that the invention in this aspect is not limited to aluminum sulphite and iron sulphite, but contemplates in general the soluble metallic sulphites other than sulphites of the alkaline earths. To recapitulate, therefore, it will be clear that a chemical reagent (such as metal or a metallic compound) will be suitable for application to the present invention, which is characterized by a capacity concurrently to go into solution, preferably with water, and to absorb sulphur dioxide therein, with the formation of an unstable compound which, upon rise of temperature (as to the boiling temperature of water or of the solution itself) will decompose and evolve a substantial proportion of its sulphur dioxide contents, wthout appreciable susceptibility to the formation of non-decomposable or insoluble compounds, such as sulphates.

In the accompanying drawings which illustrate apparatus for carrying out the process,—

Figure 1 is a diagrammatic view of the apparatus as a whole;

Figure 2 is a plan view of one of the shelves in the extractor; and

Figure 3 is a plan view of another of said shelves.

Gases from the furnace, smelter, or other source are led through flue 1 into the hot tower 2, the principal function of which is to cool and clean the gases. From tower 2 the gases pass through pipe or flue 3 into the bottoms of towers $4^a$, $4^b$, $4^c$, in parallel; thence from the tops of these towers by pipe or flue 5 into the bottoms of towers $6^a$, $6^b$, $6^c$, in parallel; thence from the tops of these towers by pipe or flue 7 into the bottom of tower 8; and thence by pipe or flue 9 to the stack or the atmosphere.

The hot tower 2, the towers $4^a$, etc, (which may be termed the 4-group), the towers $6^a$, etc. (which may be termed the 6-group) and the tower 8 may all be substantially similar and may be packed with masses of broken solid material, or otherwise so constructed that water or liquor descending through the towers will be broken up to present extensive superficial areas for contact with the gases rising through the towers. The packing material in tower 8 will preferably be a mineral containing soluble aluminum salts, while the packing in the other towers may be an insoluble material such as coke or slag.

Water or the liquor is delivered through pipe 10, aided by pump 11, into the top of tower 8 in which it trickles down over the packing in contact with the rising gas. From the bottom of tower 8 the liquor is delivered, with the aid of a pump, by pipe 12 in parallel to headers or distributors at the tops of the several towers of the 6-group, and trickles down through said towers over the packing. From the bottoms of the towers of the 6-group the liquor flows by pipe 13 to the tops of the towers of the 4-group through which it passes in parallel, as before, thence flows by pipe 14 into a storage tank $14^a$, and thence aided by pump 15 if necessary, to the top of tank 16.

Inasmuch as the liquor passing through the towers first enters tower 8, where it flows over the mineral containing soluble aluminum compounds, it will take alumina into solution probably as a sulphite, and the liquor passing through the outer towers will therefore also be an aluminum sulphite solution. The material which I prefer to use in tower 8 to produce the aluminum sulphite solution is bauxite, but other materials containing soluble compounds of alumina, may be used instead.

Part of the liquor from the towers of the 6-group may, if desired, be sent through pipe $13^a$ into the hot tower 2, where it will become heated by the incoming hot furnace gases and give up part of its sulphur dioxide gas thereby enriching the furnace gases which pass to the towers of the 4-group. A valve $13^b$ controls pipe $13^a$. Obviously said gases might be further enriched if desired by connecting pipe 14 to the hot tower 2 in similar fashion.

The tank 16 is a combined douche tank and extractor, the upper part constituting a douche tank to cool the gases rising from the bottom of the tank, and the lower part constituting an extractor chamber for extracting the $SO_2$ gas from the solution. This preferred arrangement provides a cooling chamber mounted directly on top of the extractor chamber to receive gas directly therefrom; but the douche tank cooling chamber and the extractor chamber might be made in separate tanks connected by a pipe or flue.

The tank 16 is provided with a series of shelves or pans 17 having a central opening 18 for the passage of the rising gases, and shelves or pans 19 of less diameter than the tank 16 to leave an annular opening around the periphery for the passage of gas. The shelves 17 and 19 are alternately arranged as shown, and each shelf overlaps the opening of the next shelf, thus providing a tortuous or sinuous passage for the gases rising through the tank. The shelves are also perforated with a large number of small holes through which the solutions flow, broken up into small streams or drops like rain, to expose superficially extensive surfaces. Other arrangements of shelves which will produce a tortuous path for the gases and a large expanse of surfaces of the liquid exposed to the gas, with ample space for gas passages; may be used. 20 is a pipe or flue for the extracted $SO_2$ gas leading from the top of tank 16. Exhaust steam from the steam engine or turbine 21, is delivered by pipe 22 into the extractor chamber at the bottom of tank 16.

From the bottom of tank 16 the liquor flows by pipe 23 to a cooling pond 24 where it may be cooled by a spray, or surface cooler, if desired, and thence is pumped through pipe 10 by pump 11 into tower 8. Thus the liquor flows in a continuous circuit or cycle and may be used over and over again without substantial loss of the aluminum sulphite in solution.

If it is found necessary or advantageous to carry on the extraction in tank 16 at pressures below atmosphere, the pipe 20 may be connected to a vacuum pump 25; and if the extracted gases are to be liquefied they may be delivered from pipe 20 to suitable compressing and condensing apparatus.

The furnace or other gases containing sulphur dioxide first enter the towers of the 4-group and come in contact with the descending solution of aluminum sulphite which reduces the temperature of the gases and absorbs a certain amount of sulphur dioxide gas which enters into chemical combination with the sulphite solution. The gases then pass through the towers of the 6-group and give up more of their sulphur dioxide gas, and finally through tower 8 in which substantially all the remaining sulphur dioxide gas is taken out. The gases will also have been somewhat cooled at each stage.

I have found that aluminum sulphite is admirably adapted to the purpose of absorbing sulphur dioxide, as it has a marked capacity, in solution in water, of combining with and taking up sulphur dioxide gas, and the aluminum sulphate, if formed by oxidation, is soluble. I believe also that the presence of the bisulphite formed by the combination of aluminum sulphite with the sulphur dioxide increases the capacity of the solution to take up sulphur dioxide. The bisulphite solution formed with aluminum sulphite is also comparatively unstable, and when subjected in the extractor to the effect of reduced partial pressure of sulphur dioxide by dilution of the gas, supplemented by heat if necessary, as hereinafter described, sulphur dioxide gas readily comes out of the solution.

Although I have mentioned putting a mineral, such as bauxite, containing soluble aluminum compounds into tower 8 to produce an aluminum sulphite solution, bauxite dissolves so slowly that I recommend supplementing it by putting freshly precipitated aluminum hydrate, or equivalent compounds, into the cooling pond 24 to form a solution of sulphites which will thence be circulated through the towers as described. Or, if desired, the solution of sulphites could be made up elsewhere and circulated through the towers. It will also be found satisfactory to dispense entirely with a soluble material in tower 8 and to rely wholly on a solution made outside of the towers.

I have discovered that when a copious supply of gas other than sulphur dioxide comes in contact with the solution containing the sulphur dioxide, the latter readily comes out of the liquor. This is caused by diluting the atmosphere in contact with the liquor and consequently reducing the partial pressure of the sulphur dioxide in the gases or atmosphere contacting with the liquor. The gas used for the dilution should preferably be one that will condense more easily than the sulphur dioxide and therefore be removed before the sulphur dioxide is compressed; otherwise the volume of the diluting gas would have to be carried through the compressors which would necessitate greatly enlarged compressing apparatus, and a greater amount of power than if only the sulphur dioxide gas were compressed.

Steam is a gas which is convenient to use and admirably fulfills the requirements for diluting the atmosphere in contact with the liquor. Accordingly I direct a copious flow of exhaust steam from a large engine or turbine 21 into the bottom of the extractor through pipe 22. The greater the volume of steam admitted, the greater the dilution and the better the result. The quantity of steam should be not less than the maximum quantity that will condense and should preferably be in excess of what will condense in the tank 16, in order to insure the maximum dilution of the atmosphere in tank 16 and to obtain a substantially complete liberation of sulphur dioxide from the liquid. The exhaust steam will also furnish heat which aids the extraction, and the greater part of the steam will be condensed in the upper part of the extractor where it comes in contact with the relatively cool incoming liquor. Thus the tank 16 performs the duty of an ordinary condenser, and the combination of the steam engine with the extractor tank is therefore advantageous and economical both from the point of view of furnishing an excellent diluent for the extraction of the gas, and of the condensing of the steam of the engine.

If desired the extraction may be carried on under pressures below atmospheric and to this end a vacuum pump 25 may be connected to pipe 20. The vacuum contributes to the extraction of the sulphur dioxide gas. Vacuum, however, is not necessary with the present process, as the dilution of the atmosphere in contact with the liquor and the resulting reduction of the partial pressure of the sulphur dioxide in the gases over the liquor, will work satisfactorily when the extraction is carried on at, or even above, atmospheric pressure. In this case, the pump 25 would of course be dispensed with or a relief pressure valve provided in its place.

The extraction of the gas may be accomplished by the dilution, with or without heat and vacuum or either of them.

By making the extractor very large, and prolonging the time the liquor is exposed to treatment therein, a very large percentage of the total sulphur dioxide in the liquor may be extracted at each cycle, and it will be a commercial question to determine for each plant what will be the most economical size of extractor and therefore the proportion of sulphur dioxide that will be removed each time the liquor is circulated. The first part of the sulphur dioxide to be extracted comes off easier than the last part. On the other hand, the greater the amount of sulphur dioxide which is removed during each cycle, the less will be the volume of liquor that must be handled, and the less the liquor the less power and heat required. If the extraction is prolonged too far, a precipitate may be formed that will be hard to redissolve, and this should be avoided.

Although the reactions which take place in the process are obscure, and cannot be stated with entire certainty, I believe that the aluminum sulphite in the solution forms a chemical combination with the sulphur dioxide and becomes bisulphite in the presence of an excess of sulphur dioxide gas, and so takes up sulphur dioxide gas out of the smelter smoke or the like; and that when the atmosphere in contact with the solution is diluted, thus reducing the partial pressure of sulphur dioxide gas in the atmosphere contacting with the solution in the extractor, the bisulphite breaks up, becoming a normal sulphite, and in so doing liberates the sulphur dioxide, aided if desired by heat, or vacuum, or both.

To accomplish the desired result, the chemical used, whether aluminum sulphite or some other material, should be adapted to form a relatively unstable bisulphite and one which will react within a relatively small range of temperatures; that is, one which will combine with the sulphur dioxide gas and absorb it at moderate temperatures as the gas comes in contact with the cooler liquor in the towers, and which will also decompose at moderate temperatures in the extractor, preferably not above the boiling point of the liquor. The material should also be one which will remain soluble and will not precipitate at the temperatures used.

And the gas used to dilute the atmosphere contacting with the solution in the extractor should be supplied in copious quantities and should preferably be one which, like steam, will condense more quickly than sulphur dioxide gas, so that it may be condensed out and wholly separated from the sulphur dioxide gas before the latter passes to the compressor. By using the exhaust steam from an engine a substantial economy is effected by getting valuable work out of the exhaust steam in using it as a diluent and source of heat in the extractor, incidental to the condensing of the steam.

I claim:

1. The art of obtaining sulphur dioxide from smelter smoke or other gases with which it may be associated, which comprises absorbing the sulphur dioxide in a liquid, in the presence of a metallic compound adapted to form therewith an unstable sulphite, soluble in said liquid and not susceptible to oxidation to an insoluble sulphate, and thereafter liberating sulphur dioxide from said sulphite by decomposing the resulting solution.

2. The art of obtaining sulphur dioxide from smelter smoke or other gases with which it may be associated, which comprises absorbing the sulphur dioxide in water in the presence of a metallic compound, adapted to form therewith an unstable sulphite, soluble in water at moderate temperatures and not susceptible to oxidation to an insoluble sulphate, and again to decompose at temperatures not exceeding the boiling point of water at the pressure employed, and thereafter liberating sulphur dioxide therefrom by decomposing the compound.

3. The art of obtaining sulphur dioxide from smelter smoke or other gases with which it may be associated, which comprises absorbing the sulphur dioxide in a liquid solution containing a sulphite of a trivalent metal, and thereafter liberating sulphur dioxide by decomposing the compound.

4. The art of obtaining sulphur dioxide from smelter smoke or other gases with which it may be associated, which comprises absorbing the sulphur dioxide in a liquid solution containing aluminum sulphite, and thereafter liberating sulphur dioxide by decomposing the compound formed with the aluminum sulphite.

5. The art of obtaining sulphur dioxide from smelter smoke or other gases with which it may be associated, which comprises absorbing the sulphur dioxide gas in a liquid, and thereafter reducing the partial pressure of sulphur dioxide gas in the atmosphere contacting with the liquid by diluting said atmosphere with a gas other than sulphur dioxide in such volume as to effect a substantially complete liberation of the sulphur dioxide from the liquid.

6. The art of obtaining sulphur dioxide from smelter smoke or other gases with which it may be associated, which comprises absorbing the sulphur dioxide gas in a liquid and thereafter reducing the partial pressure of sulphur dioxide gas in the atmosphere contacting with the liquid by diluting said atmosphere with a condensible gas other than sulphur dioxide in a quantity in excess of that which will be condensed, thereby liberating sulphur dioxide from the liquid.

7. The art of obtaining sulphur dioxide from smelter smoke or other gases with which it may be associated, which comprises absorbing the sulphur dioxide gas in a liquid and thereafter reducing the partial pressure of sulphur dioxide gas in the atmosphere contacting with the liquid by diluting said atmosphere with steam in a quantity in excess of that which will be condensed, thereby liberating sulphur dioxide from the liquid, and thereafter condensing out the steam leaving sulphur dioxide gas.

8. The art of obtaining sulphur dioxide from smelter smoke or other gas with which it may be associated, which comprises absorbing the sulphur dioxide gas in a liquid, thereafter reducing the partial pressure of sulphur dioxide gas in the atmosphere contacting with the liquid by diluting said atmosphere with a condensible gas other than sulphur dioxide in a quantity in excess of that which will be condensed, said gas being condensible at lower pressure and higher temperature than sulphur dioxide gas, thereby liberating sulphur dioxide from the liquid, and thereafter condensing out the diluting gas leaving sulphur dioxide gas.

9. The art of obtaining sulphur dioxide from smelter smoke or other gases with which it may be associated, which comprises absorbing the sulphur dioxide in a liquid solution containing soluble metallic sulphites other than sulphites of the alkaline earths, and thereafter reducing the partial pressure of sulphur dioxide gas in the atmosphere contacting with the liquid by diluting said atmosphere with a gas other than sulphur dioxide in such volume as to effect a substantially complete liberation of the sulphur dioxide from the liquid.

10. The art of obtaining sulphur dioxide from smelter smoke or other gases with which it may be associated, which comprises absorbing the sulphur dioxide in a liquid solution containing soluble metallic sulphites other than sulphites of the alkaline earths, and thereafter reducing the partial pressure of sulphur dioxide gas in the atmosphere contacting with the liquid by diluting said atmosphere with steam in a quantity in excess of that which will be condensed, thereby liberating sulphur dioxide from the liquid, and thereafter condensing out the steam leaving sulphur dioxide.

11. The art of obtaining sulphur dioxide from smelter smoke or other gases with which it may be associated, which comprises absorbing the sulphur dioxide in a liquid solution containing aluminum sulphite to form with the sulphur dioxide an aluminum bisulphite, reducing the partial pressure of the sulphur dioxide gas in the atmosphere contacting with the bisulphite solution by diluting said atmosphere with a copious supply of steam to decompose the aluminum bisulphite and liberate sulphur dioxide, and condensing out the steam leaving sulphur dioxide.

12. Apparatus for obtaining sulphur dioxide from a solution containing the same, comprising a combined extractor chamber and exhaust steam condenser, means for delivering the solution into the extractor chamber, and means adapted to deliver exhaust steam to said chamber in an amount exceeding that of the solution under treatment, means for withdrawing residual vapors from the extractor, and means for withdrawing liquids therefrom, thereby conducting said liquids and vapors in countercurrent relationship, whereby the combined heat of the exhaust steam and the reduction of the partial pressure of sulphur dioxide in the atmosphere within the extractor resulting from its dilution by steam will liberate sulphur dioxide gas from the solution, and the solution will in turn condense the exhaust steam.

13. Apparatus for the concurrent condensation of exhaust steam and recovery of sulphur dioxide from solutions containing the same, comprising an extractor chamber, means for circulating said solution through the extraction chamber, means for drawing exhaust steam into and through the extraction chamber, under reduced pressure, means for facilitating the free passage of said steam in intimate contact with said solution, and means for withdrawing the evolved and uncondensed vapors from said extractor chamber.

14. Apparatus for the concurrent condensation of exhaust steam and recovering the sulphur dioxide from a solution containing the same, comprising an extractor chamber, means for delivering the sulphur dioxide solution to the extractor chamber, means for withdrawing the extracted solution and condensate therefrom, inlet means adapted to admit a large proportionate volume of steam into said extractor and in intimate contact with the solution therein, and means for rapidly withdrawing the uncondensed vapors from said extractor, thereby to initiate and maintain a reduced pressure throughout said extractor and said steam inlet means.

15. Apparatus for the concurrent condensation of exhaust steam and recovery of sulphur dioxide from a solution containing the same comprising an extractor chamber, means for delivering the sulphur dioxide solution to the extractor, a steam turbine exhaust, means connecting the exhaust to said extractor chamber to provide for the free passage of steam therethrough and in intimate unobstructed contact with said sulphur dioxide solution, suction means for withdrawing uncondensed vapors from said extractor and adapted thereby to create and maintain a partial vacuum, substantially undiminished throughout said extractor and exhaust, and means for withdrawing the extracted solution and condensate from said extractor.

16. Apparatus for the concurrent condensation of exhaust steam and recovery of sulphur dioxide from a solution containing the same, comprising an extractor chamber, inlet means for introducing the sulphur dioxide solution in widely distributed condition into the upper portion of the extractor, a steam turbine exhaust, means connecting the exhaust to the extractor chamber to provide for the free passage of steam from said exhaust into the lower portion of the extractor chamber and in intimate contact with said sulphur dioxide solution therein, suction means for withdrawing the uncondensed vapors from the upper portion of said extractor, and adapted to maintain a partial vacuum substantially undiminished throughout said extractor and turbine exhaust, and means for withdrawing the extracted solution and condensate from the lower portion of said extractor chamber.

Signed by me at Boston, Massachusetts, this 2 day of February, 1920.

AUGUSTUS H. EUSTIS.